United States Patent [19]
Rowlette

[11] Patent Number: 5,643,696
[45] Date of Patent: *Jul. 1, 1997

[54] BATTERY PLATES WITH LIGHTWEIGHT CORES

[75] Inventor: John J. Rowlette, Monrovia, Calif.

[73] Assignee: Bipolar Power Corporation, Whittier, Calif.

[*] Notice: The term of this patent shall not extend beyond the expiration date of Pat. No. 5,334,464.

[21] Appl. No.: 523,677

[22] Filed: Sep. 5, 1995

Related U.S. Application Data

[63] Continuation of Ser. No. 96,118, Jul. 22, 1993, abandoned, which is a continuation-in-part of Ser. No. 932,521, Aug. 20, 1992, Pat. No. 5,334,464, which is a continuation-in-part of Ser. No. 733,471, Jul. 22, 1991, abandoned.

[51] Int. Cl.$^6$ ............................................. H01M 4/70
[52] U.S. Cl. ...................... 429/210; 429/225; 429/245
[58] Field of Search ................................ 429/210, 245, 429/225, 238

[56] References Cited

U.S. PATENT DOCUMENTS

| | | |
|---|---|---|
| 2,564,707 | 8/1951 | Mochel . |
| 3,728,158 | 4/1973 | Poe et al. . |
| 4,037,031 | 7/1977 | Jacob . |
| 4,098,967 | 7/1978 | Biddick et al. . |
| 4,208,473 | 6/1980 | Bradley . |
| 4,275,130 | 6/1981 | Rippel . |
| 4,324,848 | 4/1982 | Will . |
| 4,326,017 | 4/1982 | Will . |
| 4,353,969 | 10/1982 | Rippel et al. . |
| 4,394,613 | 7/1983 | Cole . |
| 4,405,697 | 9/1983 | Rowlette . |
| 4,422,917 | 12/1983 | Hayfield . |
| 4,507,372 | 3/1985 | Rowlette . |
| 4,510,219 | 4/1985 | Rowlette . |
| 4,539,268 | 9/1985 | Rowlette . |
| 4,542,082 | 9/1985 | Rowlette . |
| 4,547,143 | 10/1985 | Rowlette et al. ................. 424/212 |
| 4,547,443 | 10/1985 | Rowlette et al. . |
| 4,603,093 | 7/1986 | Edwards et al. . |
| 4,625,395 | 12/1986 | Rowlette . |
| 4,637,970 | 1/1987 | Yeh et al. ........................ 429/153 |
| 4,658,499 | 4/1987 | Rowlette . |
| 4,708,918 | 11/1987 | Fitzgerald et al. . |
| 4,713,306 | 12/1987 | Pinsky et al. . |
| 4,735,870 | 4/1988 | Rowlette . |
| 4,787,125 | 11/1988 | Pinsky et al. . |
| 4,861,689 | 8/1989 | Clough et al. . |
| 4,900,643 | 2/1990 | Eskra et al. . |
| 4,908,282 | 3/1990 | Badger . |
| 4,909,955 | 3/1990 | Morris et al. . |
| 5,002,841 | 3/1991 | Belongia et al. . |
| 5,114,807 | 5/1992 | Rowlette . |
| 5,334,464 | 8/1994 | Rowlette ........................ 429/210 |
| 5,348,817 | 9/1994 | Rao . |

FOREIGN PATENT DOCUMENTS 02 158 057 9/1990 Japan .

*Primary Examiner*—M. Nuzzolillo
*Attorney, Agent, or Firm*—Fish & Richardson, P.C.

[57] ABSTRACT

The *Battery Plates with Lightweight Cores* disclosed and claimed above solve the problems encountered by previous attempts to construct practical bipolar plates for lead-acid batteries. The preferred embodiment (10) includes a thin, lightweight, inexpensive metal core (12) with very high thermal and electrical conductivity. The lower or negative side (12b) of the core (12) is covered with a negative side protective layer (16) which defends the core (12) from an acidic environment. The upper or positive side (12a) of the core (12) is covered with a positive side protective layer (18) which safeguards the core (12) from a hostile oxidizing electrochemical environment. In the preferred embodiment, the core (12) is aluminum, the negative side protective layer (16) is lead and the positive side protective layer (18) is doped stannic oxide. Intermediate layers (14a & 14b) of copper or nickel may be placed between the core (12) and the negative and positive protective layers (16 & 18) to promote adhesion. Various alternative embodiments (20, 32, 42) that employ different combinations of materials are described in the specification. The invention may be implemented using positive and negative side seals (58 & 68).

10 Claims, 10 Drawing Sheets

LEAD

C/P
CARBON IN PLASTIC

LS/P
LEAD SPHERES IN PLASTIC

C/P
SnO2/P
C IN PLASTIC WITH DOPED SnO2 +
−

C/P
SnO2/P
LEAD, SnO2/P & C/P
Pb
+
−

Pb  P
QUASI BIPOLAR PLATE
Pb

BATTERY PLATES WITH LIGHTWEIGHT CORES

This application is a continuation of U.S. application Ser. No. 08/096,118, filed Jul. 22, 1993, now abandoned, which is a continuation-in-part of Ser. No. 07/932,521 filed Aug. 29, 1992 now U.S. Pat. No. 5,334,464 which is a continuation-in-part of Ser. No. 07/733,471, filed Jul. 22, 1991 now abandoned.

FIELD OF THE INVENTION

The present invention relates to the field of rechargeable electrical batteries, and, more specifically, to a novel plate construction for use in bipolar lead-acid batteries.

CROSS-REFERENCE TO RELATED PATENT APPLICATIONS AND CLAIM FOR PRIORITY

The present application is a Continuation-in-Part application. The inventor hereby claims the benefit of priority under Section 120 of Title 35 of the United States Code of Laws for any and all subject matter which is commonly disclosed in the present application and in pending patent application U.S. Ser. No. 07/932,521 entitled *Lightweight Battery Plates* by John J. Rowlette, filed on 20 Aug. 1992. This parent patent application, U.S. Ser. No. 07/932,521, is itself a Continuation-in-Part application based on a grand-parent application also entitled *Lightweight Battery Plates* by John J. Rowlette, filed on 22 Jul. 1991 and assigned U.S. Ser. No. 07/733,471.

BACKGROUND OF THE INVENTION

Conventional Lead-Acid Batteries

Conventional lead-acid batteries generally comprise a series of separate (monopolar) positive and negative electrodes, connected in a combined series and parallel arrangement to achieve the desired voltage and current. Each electrode usually consists of a grid constructed of lead (Pb), or a lead alloy which is filled with and covered with an active electrode material. Lead dioxide is used as the active electrical material for the positive electrode, and sponge lead is used for the negative electrode in a fully charged battery. The purpose of the grid is twofold: to contain the active material so that the electrodes may be suspended in the sulfuric acid electrolyte solution, and to collect and to conduct the electrical current generated by the active materials, so it can be transferred to the outside of the battery. The grid is ordinarily constructed of lead metal for four reasons:

1. Lead is electrically conductive;
2. Lead is resistant to corrosion in the sulfuric-acid electrolyte solution;
3. The metal is relatively inexpensive, as compared to more resistant but unaffordable materials such as gold or platinum; and
4. Lead has exceptionally high gassing over-voltages for both hydrogen and oxygen, which minimizes the electrolytic decomposition of water in the electrolyte, and maximizes the formation efficiency of the active electrode materials, lead and lead dioxide.

The construction of conventional lead-acid batteries results in a number of problems which limit their usefulness in two important applications: electric automobiles and electric utility energy storage. The three main problems of prior lead-acid batteries are:

1. The excessive weight required to achieve high-power discharges needed by electric vehicles;
2. The excessive weight required to store appreciable energy; and
3. The batteries have insufficient life to be economical.

The excessive weight of lead-acid batteries is due to the extensive use of lead, one of the heaviest natural materials. The power of lead-acid batteries is largely limited by the use of a grid design to collect and conduct the electrical current, which forces the current to travel along a high resistance path that limits the useful power from the battery.

Conventional versus Bipolar Lead-Acid Batteries

FIG. 1 depicts a conventional lead-acid battery. An external case CS and internal partitions PAR enclose cells which contain positive (+) and negative (−) plates deployed in a spatially parallel arrangement. These plates are grids that are characterized by a pattern of indentations or open spaces which are covered with an active material. The positive plates are covered with a positive active material PAM, and the negative plates are covered with a negative active material NAM. FIG. 1 shows a pair of positive (+) and negative (−) grids in cross-section GCS bearing these active materials. Positive and negative grids are segregated within the partitions PAR by separators SEP. The spaces around the plates that come into contact with the positive and negative active materials are filled with a sulfuric acid electrolyte EL. The plates are connected to a pair of terminals T that reside on the outside of the case CS.

The bipolar battery shown in FIG. 2 is fundamentally different from the conventional lead-acid battery portrayed in FIG. 1. A case CS having protruding terminals T encloses a group of plates that are arranged in a spatially parallel configuration, but the plates in the bipolar battery and the way they are connected are quite dissimilar from the conventional battery. Each electrode in a bipolar battery comprises a separate grid containing either the positive or negative materials, and is suspended in a battery cell. Bipolar battery construction utilizes a series of bipolar battery plates called "biplates" BP. These biplates BP are solid sheets of material that divide the battery into cells and provide electrical contact between the positive and negative electrode materials of adjacent cells. A positive grid PG and negative grid NG are compared to a biplate BP in FIGS. 3 and 4.

The stack of biplates BP shown in FIG. 2 is held together by endplates EP. The positive side of each biplate BP is covered by a positive active material PAM, while the negative side of each biplate is covered by a negative active material NAM. The spaces between the biplates BP contain separators SEP and electrolyte EL. The areas ESA around the lateral surfaces of each biplate BP may be fitted with some type of edge seal.

In the bipolar battery, the electrical current needs to pass only through the thin bipolar plates BP, which also serve as the physical partitions between the cells. The electric current can, therefore, pass through the entire battery in a direction perpendicular to the plane of each biplate BP. This arrangement presents a very large cross sectional area and very short distance for the current to pass between cells, compared to the small electrical cross section of the grid and long electrical path to the next cell which is encountered in ordinary batteries. As a consequence of these large geometrical differences between the electrical paths in conventional versus bipolar batteries, the electrical resistance in the bipolar battery is approximately one fifth of conventional batteries. With this reduction in internal resistance, a high power battery suitable for electrical automobile propulsion becomes possible, provided the battery does not have excessive weight, can be constructed at an affordable cost, and also has a sufficiently long life.

The life of previous conventional and bipolar lead-acid batteries is limited by a number of failure modes. The two most common of these are the microscopic morphological degradation of the positive active material ($PbO_2$) and the corrosion of the lead material used to construct the positive grids. The effects of microscopic morphological degradation have been largely overcome by the use of electrically conductive glass fibers that are coated with doped stannic oxide and placed within the active material, as described in my U.S. Pat. No. 4,507,372. The corrosion of lead, however, cannot be completely overcome because of its intrinsic thermodynamic instability at the electrical potential, i.e., approximately 1.75 volts relative to hydrogen ($H_2/H^+$) found at the positive electrode in lead-acid batteries. This results in the slow corrosion of the lead and the formation of lead dioxide, which is mechanically weak. Eventually, sufficient corrosion of the lead grids in the positive electrode occurs and the battery performance degrades to a useless level. In contrast, the negative electrode grid suffers from no such corrosion because lead is thermodynamically stable at the negative electrode potential, 0.36 volts below the hydrogen electrode ($H_2/H^+$). The negative lead grid, therefore, has an indefinite life. The foregoing discussion, although referring to the lead grids used in today's monopolar batteries, is relevant to the present invention because the same operating environments are present, i.e., sulfuric-acid electrolyte and two different electrical potentials.

Unlike grids, however, the bipolar plate must simultaneously withstand a pair of positive and negative electrochemical reactions, oxidation and reduction. As a consequence, the first plates used to construct bipolar lead-acid batteries were made of solid lead, like their grid counterparts in conventional batteries. These bipolar plates were impractical for most applications, however, because of their heavy weight and the relentless corrosion. Eventually this corrosion results in a perforation of the biplate. The perforation causes an immediate electrical short between the cells, destroying cell integrity and degrading the battery. Several attempts to construct a practical plate for bipolar batteries are illustrated in FIGS. 5, 6, 7, 8, 9 and 10. One of the greatest challenges confronting developers of the bipolar lead-acid battery has been the construction of a bipolar plate which is light-weight, but which does not achieve the reduced weight by adding more cost or by compromising power capacity or useful lifetime. Each of the six different types of previous biplates, shown in FIGS. 5 through 10, are beset by their own particular shortcomings. The first lead battery plates, pictured in FIG. 5, were soft and difficult to work with. Repeated charging and discharging first creates corrosion on the plate surface. This corrosion creates areas of high electrical resistance. Eventually, the plate becomes perforated and the battery fails. Several years ago, a carbon-in-plastic plate C/P, like the one shown in FIG. 6, was developed. This hybrid plate fails quickly because the carbon oxidizes and forms acetic acid and carbon dioxide. The carbon-in-plastic plate was improved by incorporating solid lead spheres in the plastic plate, as shown in FIG. 7. This invention is described in my U.S. Pat. No. 4,658,499. Later, the carbon-in-plastic plate was improved somewhat further by adding a second layer of plastic containing the same conductive glass fibers as used in the positive electrode material. This improvement is described in my U.S. Pat. No. 4,507,372. The resulting combination plate is depicted in FIG. 8. A more complex design, which is portrayed in FIG. 9, adds a third layer of pure lead to the double plastic plate. Yet another attempt at providing a biplate for a high-power, bipolar battery is revealed by FIG. 10. This apparatus, called a "quasi-bipolar plate", includes a wrapping of lead that envelopes a plastic center, in which conduction is not through the plate as with a true biplate, but occurs around the folded edge. Although lighter in weight than pure lead, none of these hybrid or composite biplates has proven to be as good an electrical conductor or as corrosion-resistant and reliable, or as inexpensive, as the original lead plate.

Two previous bipolar battery designs are revealed in FIGS. 11 and 12. FIG. 11 is an illustration of a *Sealed Bipolar Multi-Cell Battery*, which is described in my U.S. Pat. No. 4,539,268. This low maintenance battery LMB has a pair of terminals T and a resealable vent V protruding from a housing H. The housing H encloses positive and negative plates PP and NP that are separated by fiberglass mats M. FIG. 12 provides an illustration of the stack configuration of the *Lightweight Bipolar Storage Battery*, which is described in my U.S. patent application Ser. No. 07/516,439 filed on Apr. 30, 1990. The exploded view in FIG. 12 shows a bipolar plate battery B which includes a top cover TC that protects an end plate EP, a current collector plate CC, and a current removing element CR. The enclosure E at the bottom of the assembly includes two leads L protruding from it and is designed to hold a similar group of elements that includes another end plate EP, current collector plate CC, and current removing element CR. All of these elements surround a central stack S of bipolar plates.

Despite all of these proposed solutions, the central goal of providing a biplate so that a powerful, lightweight, and practical bipolar lead-acid battery can be manufactured has remained elusive. The previous biplates are either expensive to manufacture, are extremely heavy, or are susceptible to debilitating corrosion because the plates oxidize rapidly under the severe acidic and electrical environments within the battery. The practical bipolar plate must possess a combination of critical characteristics: sufficient electrical conductivity, resistance to the different corrosion mechanisms occurring simultaneously on both the positive and negative sides of the plate, low weight, and low cost. The problem of developing a biplate with these characteristics for the bipolar lead-acid battery has presented the major obstacle to its successful development and commercialization. The achievement of a light yet powerful lead-acid storage battery that would be suitable for applications such as electric automobiles would constitute a major technological advance useful in both the automotive industry and the electrical power storage business. The enhanced performance that could be achieved using such an innovative device would satisfy a long felt need within the power and transportation industries.

SUMMARY OF THE INVENTION

The *Battery Plates with Lightweight Cores* disclosed and claimed below solve the problems encountered by previous attempts to construct practical bipolar plates for lead-acid batteries. The present invention utilizes a thin, lightweight, inexpensive metal core with very high thermal and electrical conductivity. One side of the core is covered with a negative side protective layer which protects the core from an acidic environment. The other side of the core is covered with a positive side protective layer which protects the core from a hostile oxidizing electrochemical environment. In the preferred embodiment, the core is aluminum, the negative side protective layer is lead and the positive side protective layer is doped stannic oxide. Intermediate layers of copper or nickel may be placed between the core and the negative and positive protective layers to promote adhesion. Various alternative embodiments that employ different combinations of materials are described in detail below.

The present invention may be used to construct an extremely lightweight and highly powerful secondary storage battery that does not suffer from the problems that plague previous lead-acid batteries. This invention not only surmounts the manufacturing impediments and corrosion difficulties explained above in the background section, but also provides an entirely new class of mobile power supplies that will revolutionize the transportation industry. This innovative method and apparatus provide an enormously efficient storage battery that will enable auto and truck manufacturers to produce the first truly practical electric vehicles. The present invention will also supply electric utilities with an extremely efficient load leveling battery that will benefit consumers around the world.

An appreciation of other aims and objectives of the present invention and a more complete and comprehensive understanding of this invention may be achieved by studying the following description of a preferred embodiment and by referring to the accompanying drawings.

A BRIEF DESCRIPTION OF THE DRAWINGS

Figure 1:
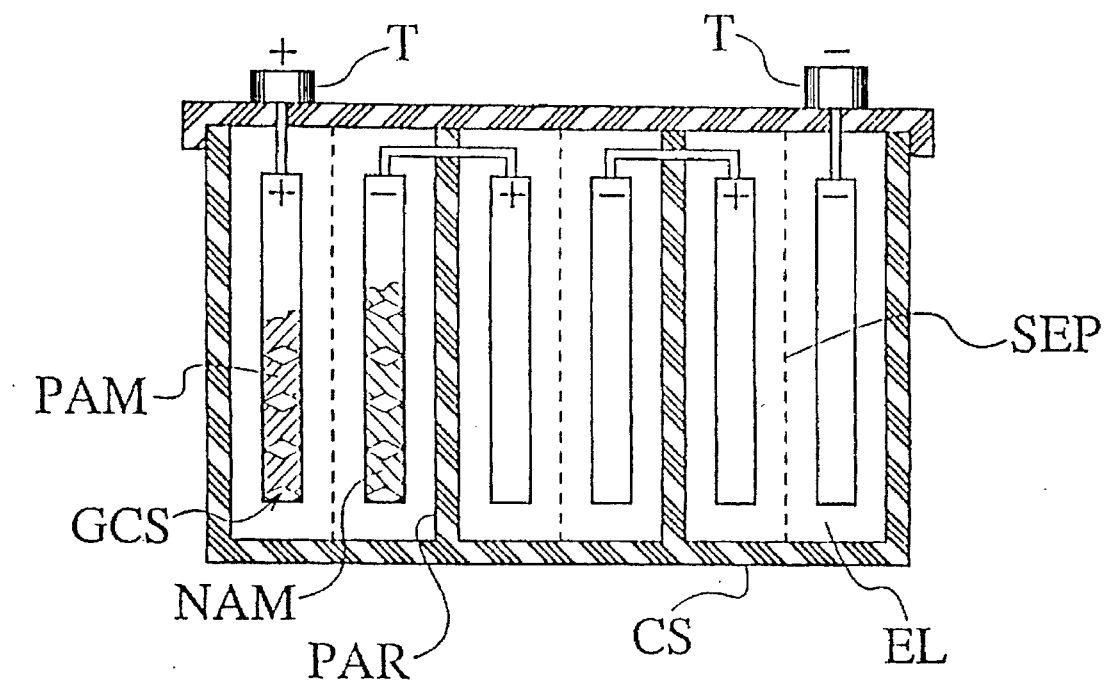
FIG. 1 is a schematic cross-sectional view of a conventional lead-acid battery.
Figure 2:
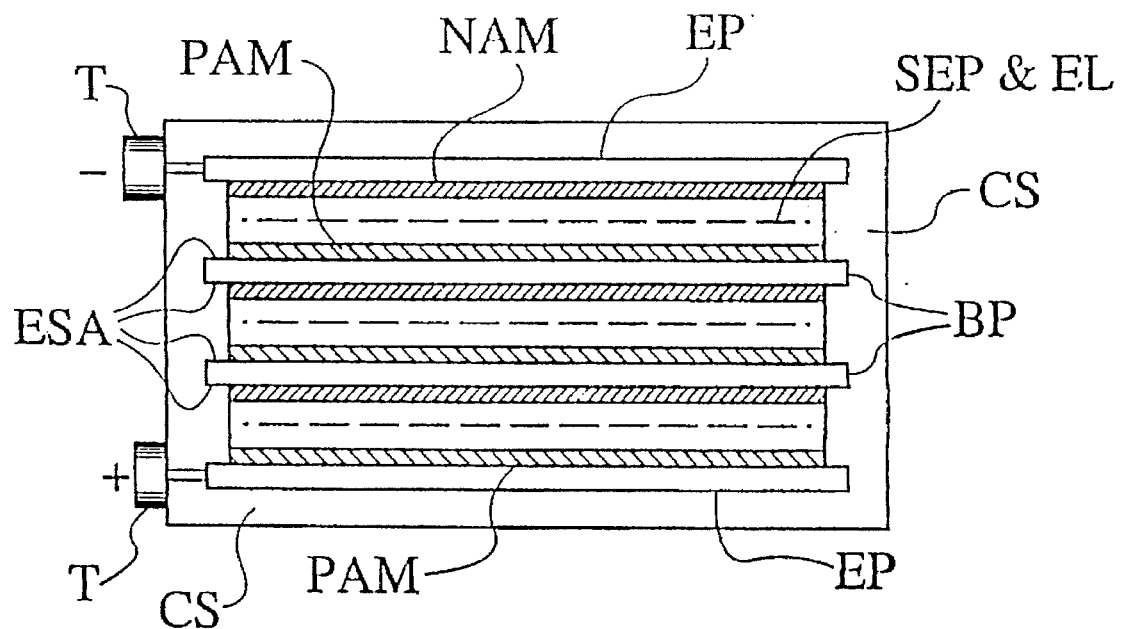
FIG. 2 is a schematic cross-sectional view of a bipolar lead-acid battery.
Figure 3:
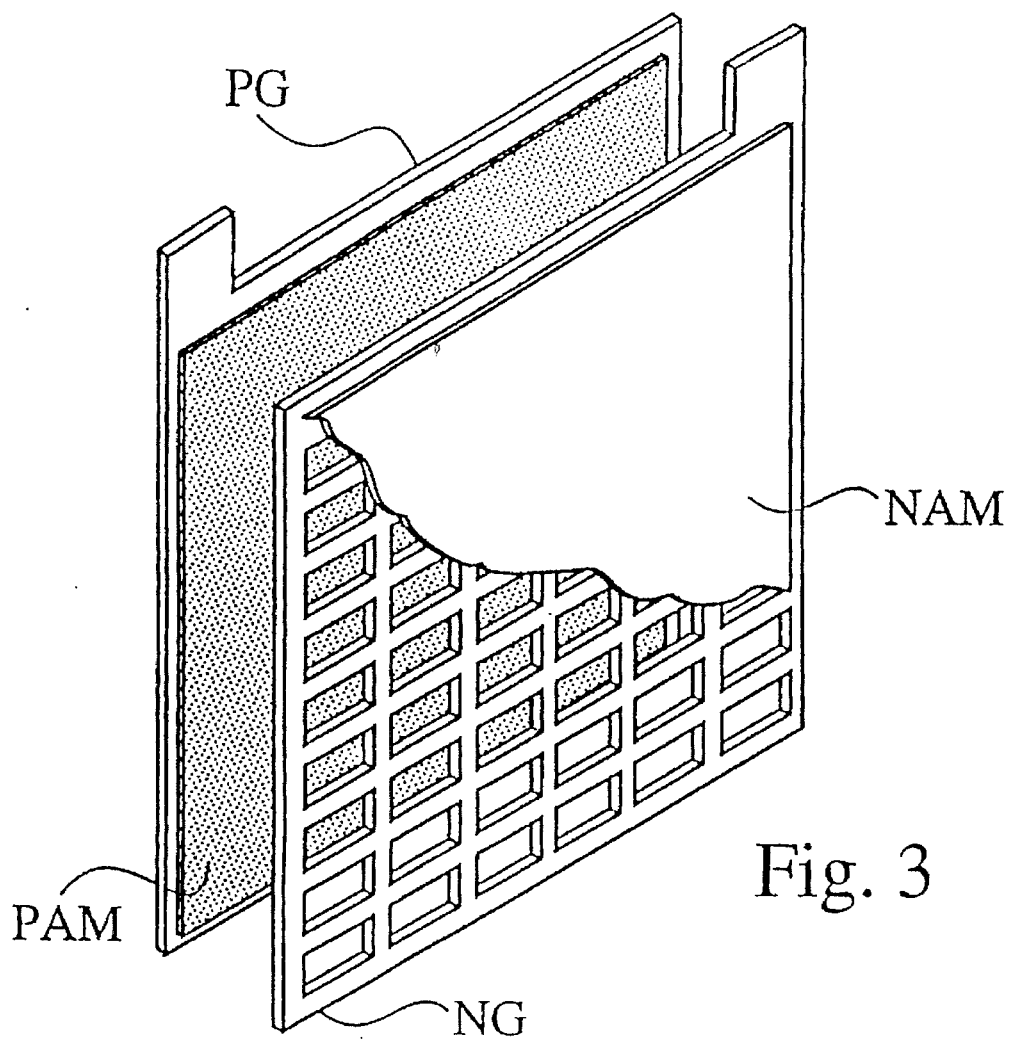
Figure 4:
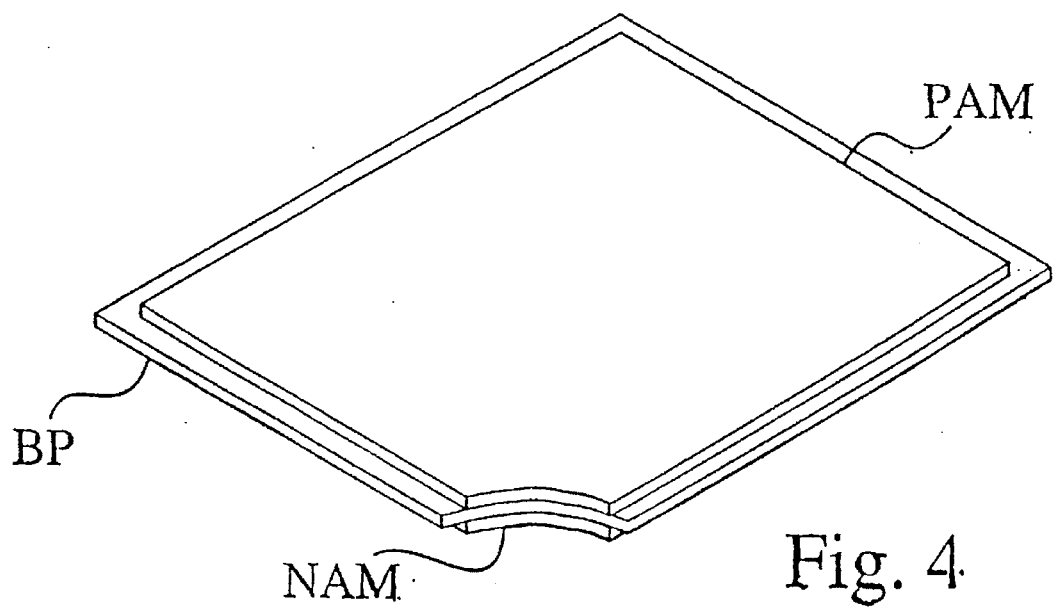
Figure 5:
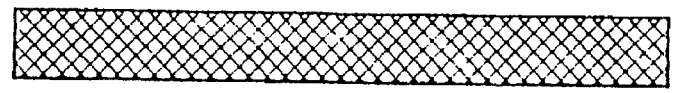
Figure 6:
Figure 7:
Figure 8:
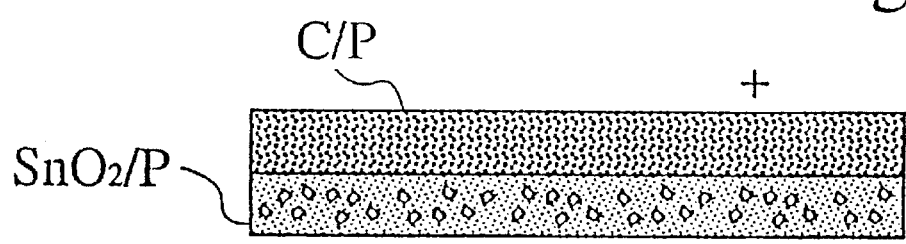
Figure 9:
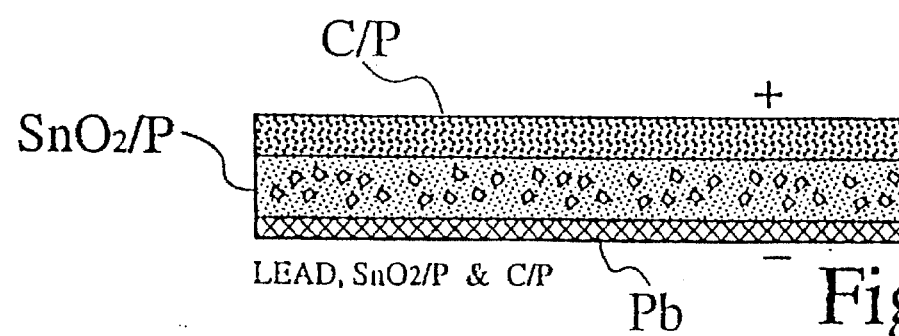

FIGS. 3 and 4 compare the structures of grids and bipolar plates. FIGS. 5, 6, 7, 8, 9 and 10 present a series of six illustrations of previous approaches to the construction of bipolar battery plates. None of the dimensions presented in FIGS. 5 through 10 are shown to scale.

Figure 11:
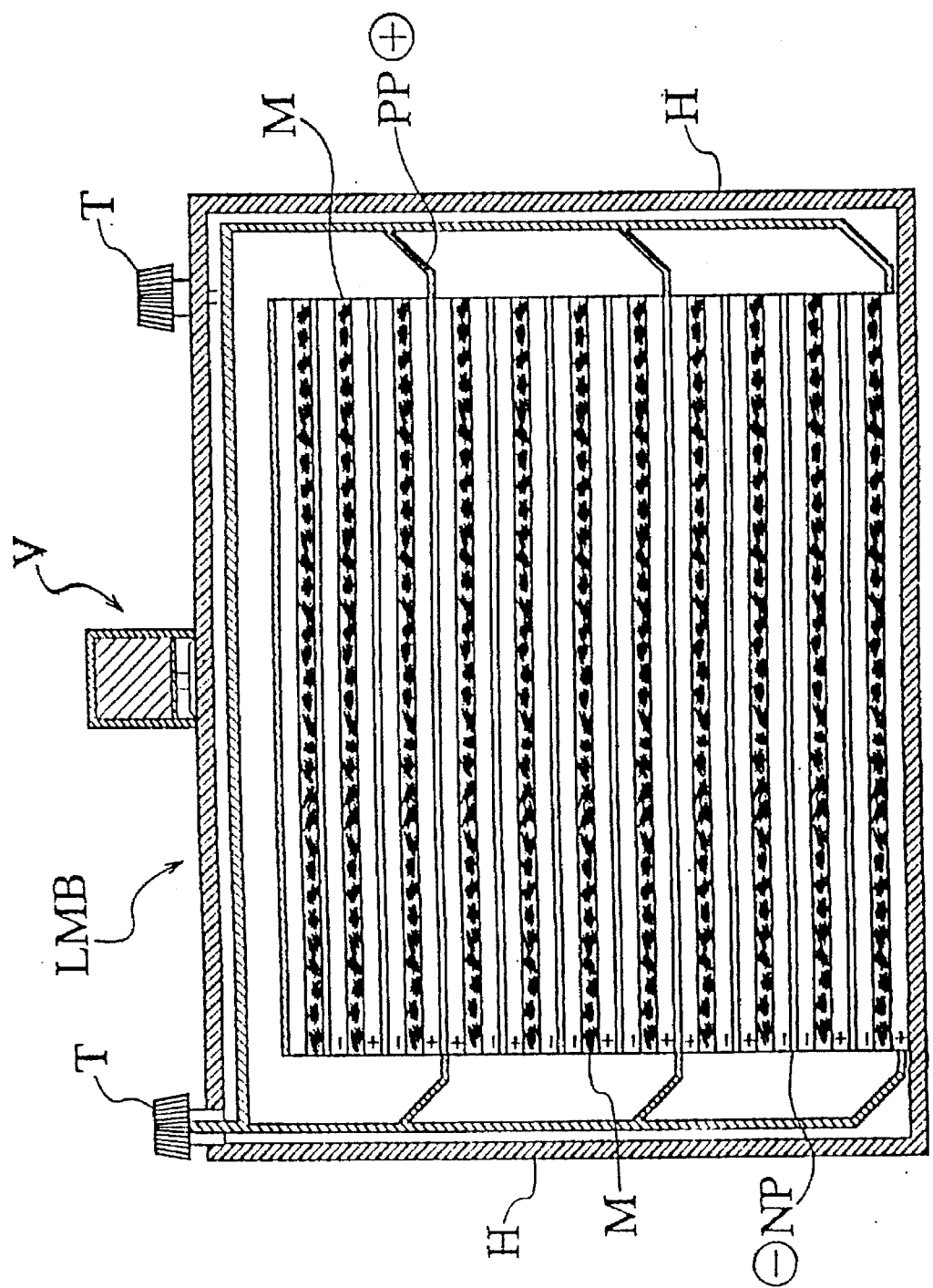

FIG. 11 is an illustration of a *Sealed Bipolar Multi-Cell Battery*, which is described in my U.S. Pat. No. 4,539,268.

Figure 12:
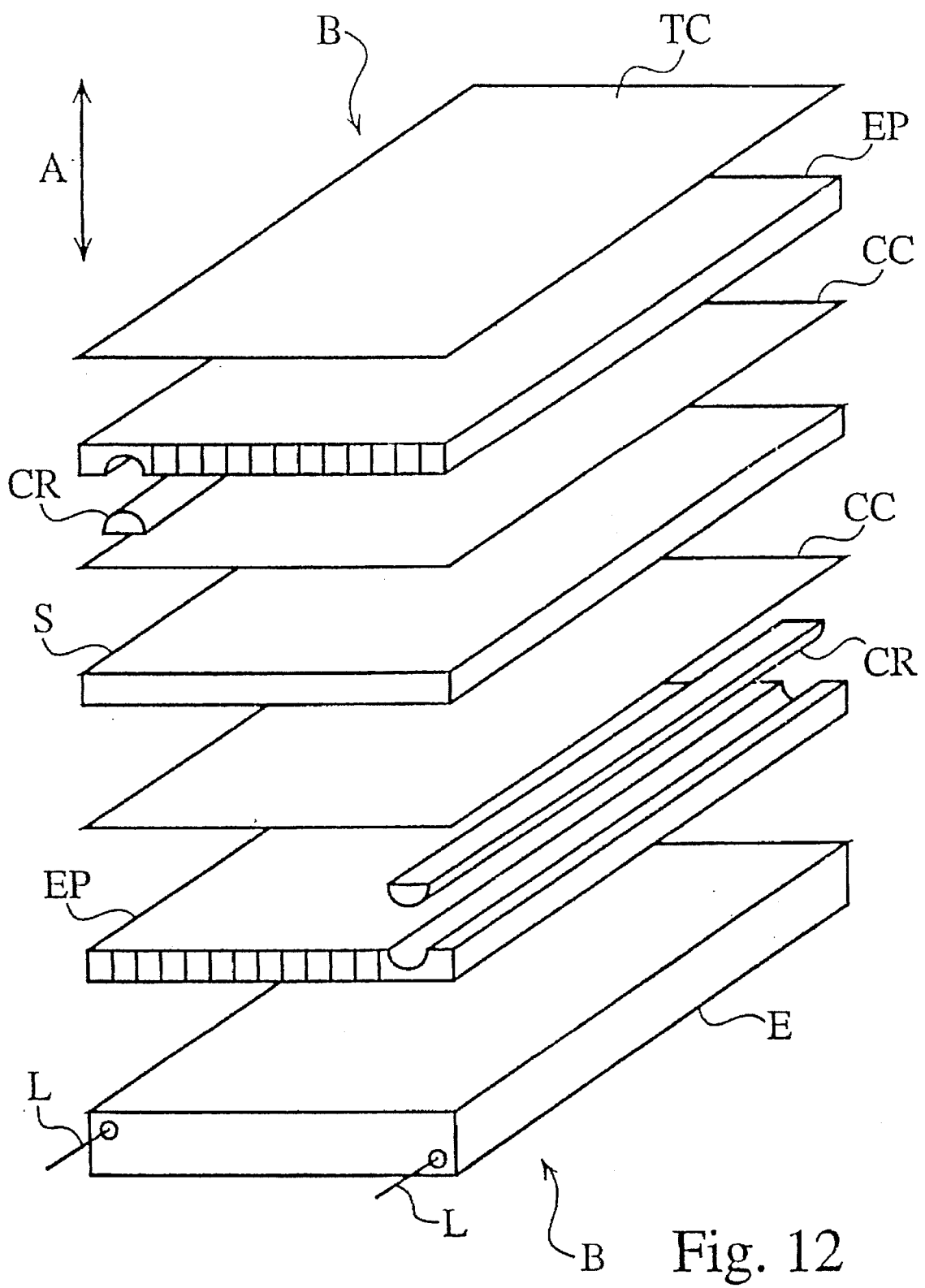

FIG. 12 provides an illustration of the stack configuration of the *Lightweight Bipolar Storage Battery* as disclosed in one of my previous patent applications.

Figure 13:
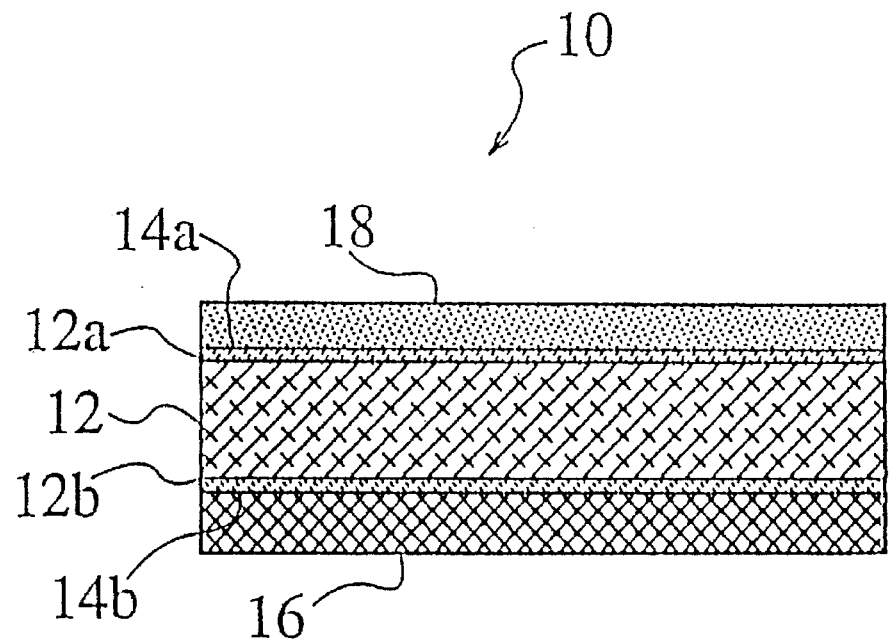

FIGS. 13 exhibits a preferred embodiment of the present invention.

Figure 14:
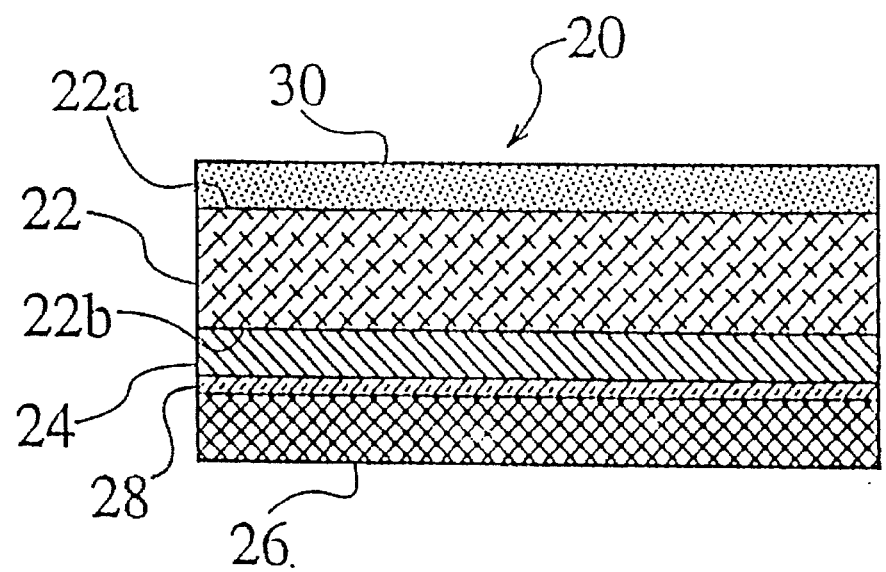
Figure 15:
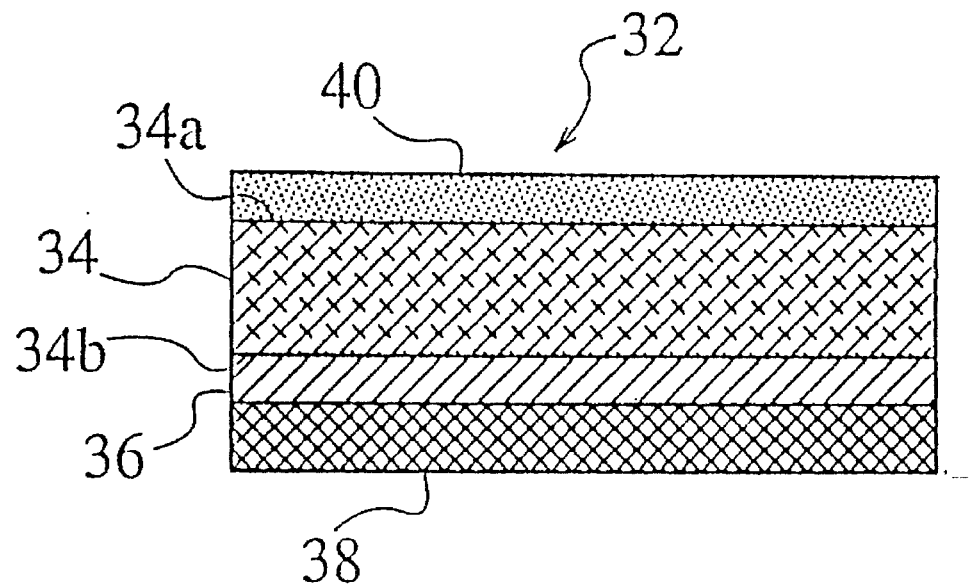
Figure 16:
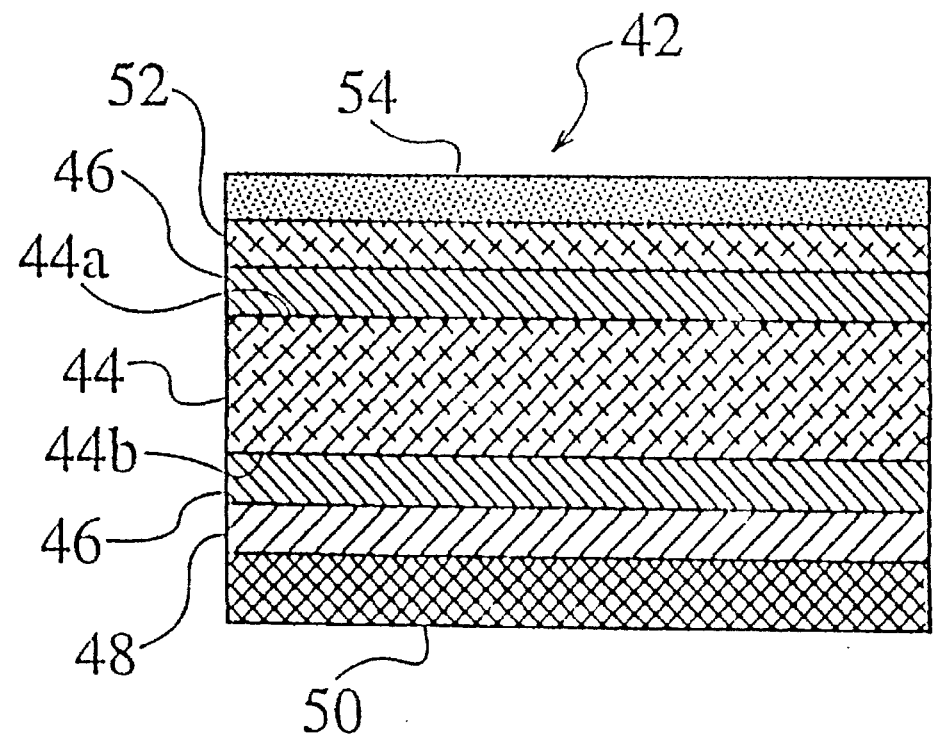

FIGS. 14, 15 and 16 portray alternative embodiments of the present invention.

Figure 17:
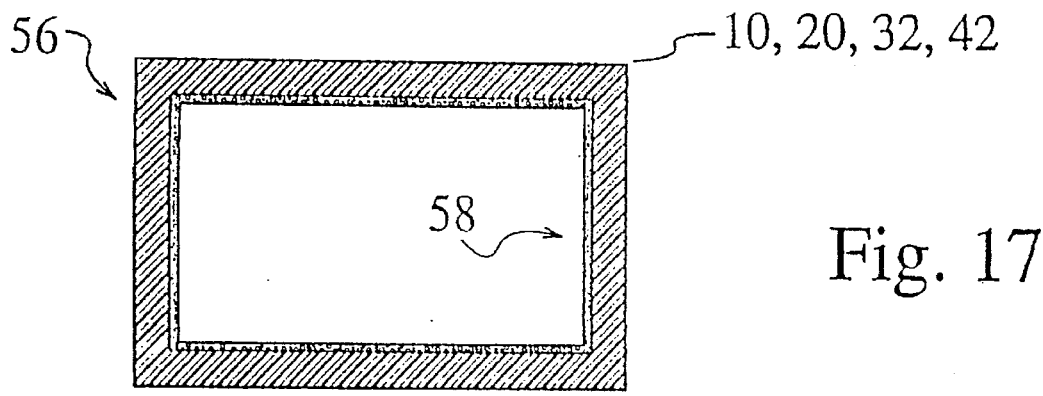
Figure 18:
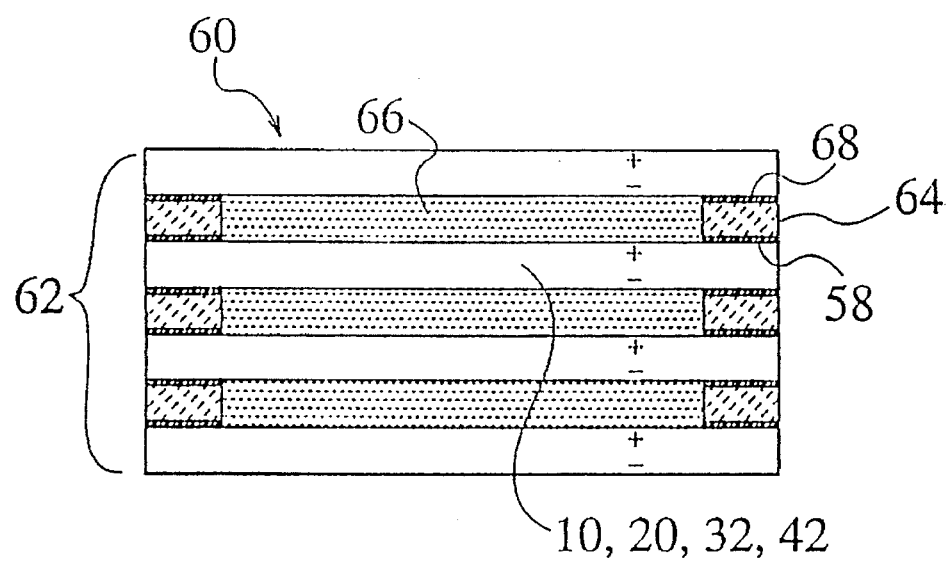
Figure 19:
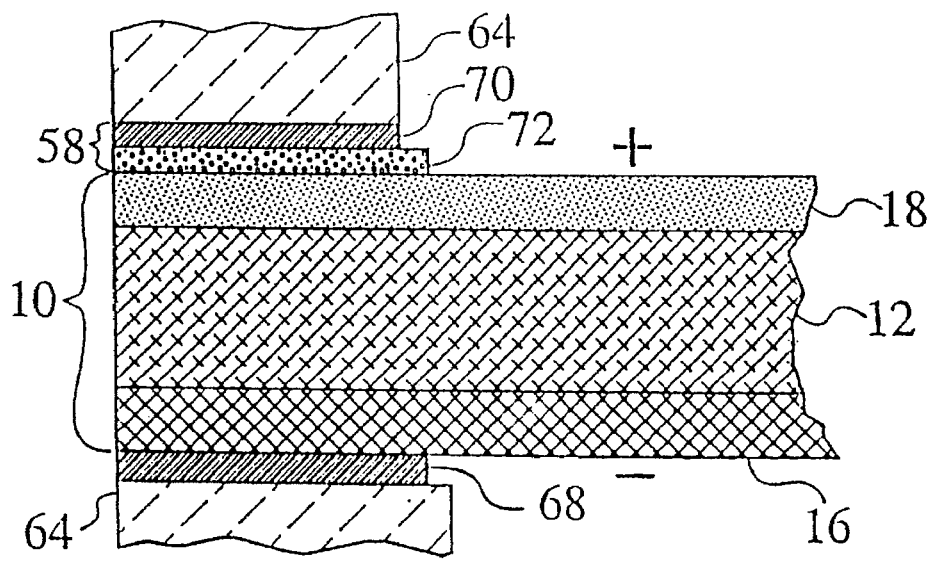

FIGS. 17, 18, and 19 illustrate edge seals that may be utilized with the various embodiments of the invention.

Figure 20:
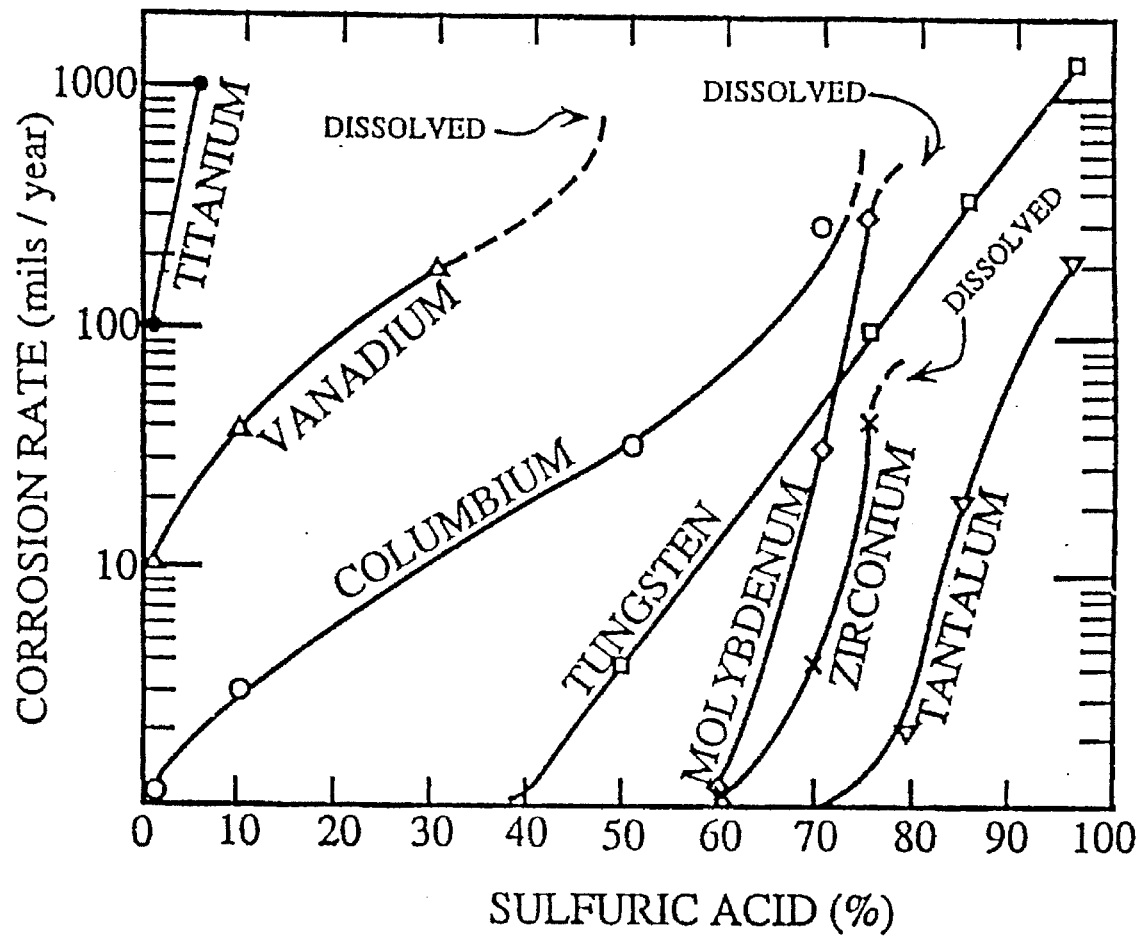

FIG. 20 is a chart that depicts corrosion rates versus concentrations of sulfuric acid for various metals.

Figure 21:
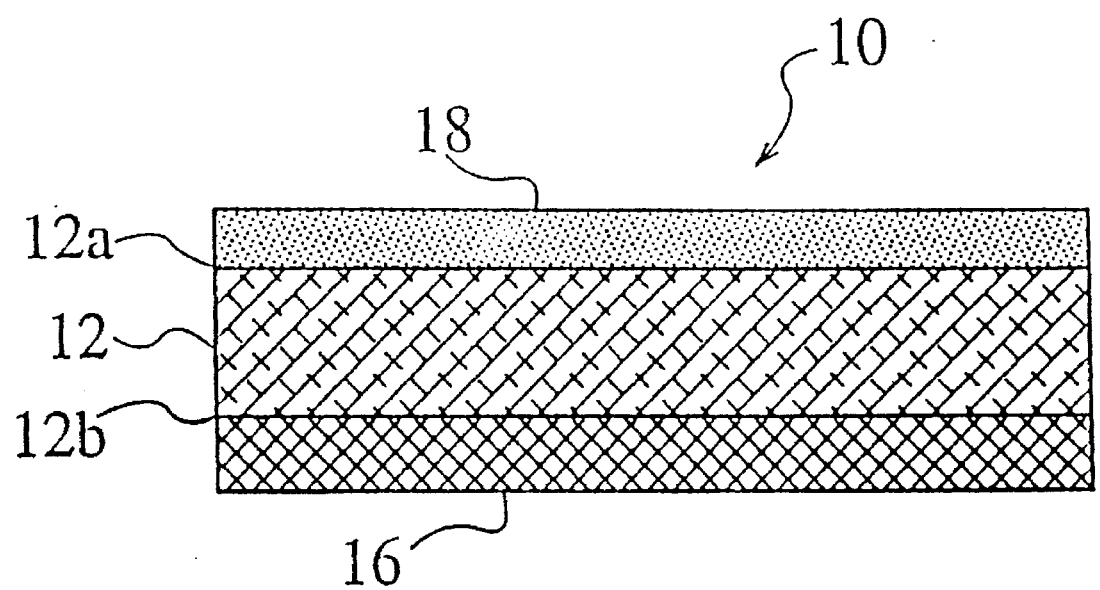

FIG. 21 shows a basic embodiment of the invention without intermediate layers.

A DETAILED DESCRIPTION OF A PREFERRED EMBODIMENT

FIGS. 1 through 12 are discussed above in the background section. The figures described below are generally schematic and do not necessarily portray the embodiments of the invention in proper proportion or scale.

A Preferred Embodiment

FIG. 13 supplies a cross-sectional view of a preferred embodiment of the present invention. In FIGS. 13, 14, 15 and 16, novel biplates are shown in cross-section without depicting positive or negative active material, electrolyte, or any of the structures or connections that might be employed to maintain the biplates within a complete battery. The novel bipolar plate 10 includes a substrate or core 12 having an upper surface 12a and a lower surface 12b. In this specification, the terms "upper" and "lower" are used only to describe relative locations in the drawings and are not intended to delineate or limit the orientation of any element of the invention. In the most preferred embodiment of the invention, this core 12 comprises aluminum. Other embodiments of the invention have cores fabricated from titanium, steel or steel alloys, magnesium, or zirconium. The primary function of the core 12 is to provide stiffness, electrical conductivity, and mechanical support for the entire bipolar plate 10. Additional mechanical strength may be achieved by the adding stiffening ribs to the core 12. In the preferred design, the core 12 should also possess an electrical conductivity of at least 1.0 ohm$^{-1}$ cm$^{-1}$. Aluminum is widely available, inexpensive, lightweight, and has very high thermal and electrical conductivity. Any material that offers these beneficial characteristics may be employed to implement the invention. In the preferred embodiment, the thickness of the core 12 ranges from about 0.005 inches to 0.025 inches.

In the preferred embodiment, intermediate layers 14a and 14b such as copper or nickel may be applied to either side of the substrate 12. Although the preferred embodiment employs both layers 14a and 14b, the invention may be practiced using only one layer 14a or 14b. These layers 14a and 14b function as wetting agents, and their thickness dimensions run from about ten to one thousand microinches. An intermediate layer 14a that resides on the positive side 12a of the core 12 can promote the adhesion of a protective coating that is applied over it. This intermediate layer 14a can also provide additional protection in the event a cell reversal occurs. This phenomenon occurs when the battery experiences abusive discharge conditions. In some embodiments of the invention, these intermediate layers 14a and 14b may be unnecessary. FIG. 21 shows a basic embodiment of the invention without intermediate layers.

A layer of lead 16 is deposited over the intermediate layer 14b that covers lower surface 12b. The lead layer 16 serves as a negative protection layer that safeguards the core 12 from the hostile acidic environment which it faces. The lead 16 on the negative side is an excellent interface for the negative electrode. This interface has an exceptionally high hydrogen over-voltages. In the preferred embodiment, sponge lead is employed as the negative active material which is applied over the lead layer 16 when the battery is assembled. This selection results in a very strong, low resistance bond. The protective coating on the negative side 16 of the substrate 12 can comprise any material that does not add significantly to the total weight of the final biplate 10. The preferred thickness dimension of the negative side protection layer 16 is 0.001 to 0.002 inches.

The negative protective layer 16 should be able to withstand sulfuric acid in the electrical potential (−0.3 to −0.4 V versus H$_2$) present on the negative side of the core 12. The negative protective coating 16 should also have a high hydrogen over-voltage to prevent gassing. Layer 16 should also have a sufficient electrical conductivity (at least 100 ohm$^{-1}$ cm$^{-1}$) and should be capable of being applied to the core 12 either alone or in conjunction with, the intermediate layer 14b. The simplest, cheapest, and most effective negative protection material is lead. The lead can be applied by a variety of methods including hot-dipping and electroplating, as is commonly done on metals, and also by vapor deposition which is done on materials which cannot be readily electroplated. In the case of lead plated on an aluminum core 12, a "flash" coating (5 to 50 micro-inches thick) of metal such as nickel or copper can be applied prior to the lead plating to promote adhesion. Because lead is thermodynamically stable on the negative side of the core 12, it does not corrode, and, therefore, the coating can be quite thin. In the preferred embodiment, a thickness of 0.002 inches is utilized. Many other metals and graphite could be used to coat the negative side of the core 12, but lead is preferred because of its relatively high hydrogen overvoltage. Lead also offers a tight mechanical and electrical interface with the sponge lead that is employed as the negative active material.

A positive protection layer of doped stannic oxide 18 is formed over intermediate layer 14a. The stannic oxide 18 is resistant to the positive potential (oxidizing) electrochemical environment with which it comes in contact. The preferred thickness dimension for the positive side protection layer 18 is from 0.3 to 10 microns. As with the negative side, a positive active material (PAM) is applied over the stannic oxide 18 when the battery is manufactured. The present invention may be implemented with positive active materials like lead dioxide that are well known to persons ordinarily skilled in the lead-acid battery arts.

The protective layer 18 on the positive side of the core 12 may be fabricated from any material which does not add significantly to the weight of the core 12 and which has reasonable corrosion resistance to the acid environment and electrical-potential (above 1.0 V) on the positive side of the core 12. The protective layer 18 should also have sufficient electrical conductivity (at least 0.01 ohm$^{-1}$ cm$^{-1}$), and be capable of being applied to the core 12, either alone or in conjunction with an intermediate layer 14a. The protective coating 18 on the positive side 12a of the core 12 should either be thermodynamically stable or degrade very slowly to yield a useful battery life. The environment on the positive side 12a of the core 12 is highly destructive to most materials because of the highly corrosive and highly oxidizing conditions that are simultaneously present. No known elements, including gold, are totally thermodynamically stable. Even many semiconducting metal oxide materials are not thermodynamically stable (e.g., as $Ti_4O_7$), although they degrade slowly enough to be useful. The stannic oxide is doped with 0.5 to 5% fluorine to provide adequate electrical conductivity, and is known to persons ordinarily skilled in the art. Doped stannic oxide is thermodynamically stable in the battery environment as shown in FIG. 12, and as shown in my U.S. Pat. No. 4,507,372 in which the material is used successfully within the positive active material itself. Dopants other than fluorine have been used to dope stannic oxide in the past. Antimony has been used as a dopant, but has been found to be less suitable because of chemical instability. Fluorine has proved to be stable and was employed successfully as the dopant for the $SnO_2$ coated glass fiber described in my U.S. Pat. No. 4,507,372. Stannic oxide is an ideal material for positive side coating because lead ions from the lead-dioxide positive active material have been shown to penetrate about 20 Angstroms into the $SnO_2$ surface, thus creating an ideal low-resistance interface. Although $SnO_2$ is thermodynamically stable at positive potentials, it will be chemically reduced during cell reversal and destroyed. Although this process requires several hours of abusive conditions, the insertion of an additional protective layer 14a between the $SnO_2$ 18 and the core 12 would tend to prevent an initial attack on the core 12 should this occur.

A First Alternative Embodiment

FIG. 14 reveals a first alternative embodiment 20 of the invention. The core layer 22 in this alternative embodiment is fabricated from titanium. This core layer 22 has an upper side 22a and a lower side 22b. The range of the thickness dimension is 0.010 to 0.020 inches. A one micron layer of zirconium or molybdenum 24 is formed over the lower side 22b of the titanium core 22. A negative side protection layer 26 resides next to the zirconium or molybdenum 24. The lead 26 is approximately 0.001 to 0.002 inches thick. A one to one hundred micron layer of copper or nickel 28 may be formed between the zirconium or molybdenum layer 24 and the lead layer 26 if needed. A positive side protection layer 30 of doped stannic oxide is placed over the upper side 22a of the titanium layer 22. The stannic oxide is approximately one micron thick.

A Second Alternative Embodiment

FIG. 15 depicts a second alternative embodiment 32 that includes an aluminum core 34 having upper and lower sides 34a and 34b, a layer of copper or nickel 36, a negative side protective layer of lead 38, and a positive side protective layer of stannic oxide 40. The core layer 34 of aluminum is 0.015 to 0.020 inches thick, and the copper or nickel 36 ranges from one to one hundred microns in depth. The lead 38 is from 0.001 to 0.002 inches thick, while the stannic oxide 40 measures from one to five microns.

A Third Alternative Embodiment

FIG. 16 illustrates a third alternative embodiment 42 comprising an aluminum core 44 (0.015 to 0.025 inches) having an upper and a lower side 44a and 44b, two layers of zirconium 46 (1 to 10 microns) surrounding the core 44, a layer of copper or nickel 48 (1 to 100 microns), a negative protective layer of lead 50 (0.001 to 0.002 inches), a layer of titanium or tantalum 52 (1 to 100 microns) and a positive protective layer of stannic oxide 54 (1 to 2 microns).

Edge Seals

FIGS. 17, 18 and 19 exhibit leak resistant edge seals that may be utilized in combination with the embodiments described above. FIG. 17 is a top view 56 of any one of the four biplates 10, 20, 32 or 42 described above along with a positive side seal 58. FIG. 18 is a cross-sectional view 60 of a portion of a battery that includes the present invention. A stack of cells 62 includes biplates 10, 20, 32 or 42 separated at their lateral edges by a spacer frame 64. The spaces on each side of the biplates are filled with an electrolyte 66. The portions of the upper and lower surfaces of each biplate which are farthest from the center of each biplate are "edge" surfaces which are each covered by two different seals. A positive side seal 58 comprising a layer of sealant material 70 and a layer of insulating material 72 resides on the edge surfaces of each biplate as shown in FIG. 19. A negative side seal 68, which includes only one layer of sealant material, is used on the edge surfaces of the negative side of each biplate.

A leak inhibiting edge seal promotes long battery life because any leakage of electrolyte would short out the cells. Without insulating material 72, the seal material 70 would be exposed to the corrosive sulfuric acid electrolyte. In addition, the seal material 70 would be exposed to an oxidizing voltage potential wherever the seal material 70 directly contacts the conductive protective layer 18. Just as no metallic elements and few metallic oxides can withstand this environment for long, there are also very few seal materials which are resistant to this environment. Notable exceptions are Teflon™ and other fluorocarbons and fluoropolymers, which unfortunately, are also difficult to bond. Common seal materials such as epoxies, urethanes, and elastomers are not thermodynamically stable and, when exposed to this environment, will all eventually oxidize, degrade, and leak. By applying an insulating material 72 around the edge of the plate 10, these common seal materials can be used successfully because they no longer are exposed to a destructive oxidizing electrical potential. In this situation, the seal material 70 that is selected need only tolerate long term exposure to the acidic electrolyte environment.

In a preferred embodiment, the insulating material 72 is an insulator having a conductivity of less than $10^{-7}$ ohm$^{-1}$ cm$^{-1}$. The insulating material 72 can be any substance which resists both the sulfuric acid electrolyte and the positive 1.75 volt oxidizing potential, and which is capable of being applied in a thin layer around the edge of the biplate 10 wherever the biplate is in contact with the edge seal material 70. The insulating material 72 can be fabricated from a variety of ceramics, i.e., non-conductive metal oxides, including but not limited to undoped stannic oxide or aluminum oxide. It can be applied to the biplate using vapor deposition, e.g., for stannic oxide. Plasma spraying or porcelainizing may also be employed. The thickness of the insulating material can be as thin as one micron for vapor deposited coatings, or may be very thick, e.g., 0.030 inch, for fired porcelain edges.

In one embodiment, the seal material 70 is undoped stannic oxide vapor that is deposited within the same equipment which is used to apply the doped stannic oxide layer 18 to the core 12. To deposit the undoped material on only a narrow margin (e.g., ¼ to ½ inch) around the core 12 edge, the center of the core 12 is masked during the final deposition step of the insulating material 72. In the case where porcelain is applied to the core edges, the application can also be confined to the edges by either masking or edge dipping prior to firing. Whichever method is used to form the insulating material 72, and whatever the design of the accompanying edge seal (i.e., a discrete seal bonded between biplates using epoxy or "caulking" between the plates with an elastomeric sealant) the objective remains the same: to insulate the edge sealant material 70 from the destructive oxidizing potential present on the positive side of the biplate 10 and thus extend the useful lives of the seal and the battery.

Material Selections for Various Applications of the Invention

Although a number of different biplate coating materials and ranges of thicknesses have been described above, the reader should recognize that the optimum biplate design will depend on the specific use for which the battery is designed. In some applications, such as electric automobiles, power and weight are more important than an application in an electric utility environment where life and cost may be the paramount considerations. For applications like emergency power storage, where the battery will not be cycled extensively and be on "float" charge, the stannic oxide coating can be omitted and the positive and negative side protective coatings can both be plain lead. The optimum combination of materials, coatings, and thickness must thus be selected for each application on an individual basis. The construction of the biplates described in the present application is also applicable to the construction of each of the two end-plates in the stack of cells in a bipolar battery. The construction methods can also be applied to the final plate at each end of the stack of cells, which will be either positive or negative. The end-plate-and-current-collector design is described in detail in my U.S. patent application Ser. No. 07/516,439 filed on Apr. 30, 1990.

Materials Utilized in the Present Invention

FIG. 20 is a chart that depicts corrosion rates versus concentrations of sulfuric acid for various metals without an applied potential. Titanium, and especially tantalum, are extremely corrosion resistant at the positive potential of a lead-acid cell. Tantalum has no measurable corrosion rate at all, even with a fluoride contamination in the electrolyte of more than 2,000 parts per million (ppm). Titanium does, however, corrode slowly at the negative potential which it may experience if the cell is ever reversed. When used in the on the positive side of the biplate, both metals should be coated with stannic oxide because they exhibit rectifying interfaces with the electrolyte.

Secure Bonds between Layers of the Biplate

In each of the embodiments disclosed above, all the layers including the core, the intermediate layers, and the negative and positive side protective layers are bonded together to form secure joints or unions between dissimilar materials. The implementation of the present invention may require the use of various chemical, mechanical or metallurgical techniques including, but not limited to, deposition, sputtering, spraying, plating, electroplating, hot-dipping, rolling, compression bonding, adhesive bonding or cladding. These fusing methods are employed to create substantially permanent connections between different surfaces.

These methods are quite different from the far less stable and loose coverings or coatings of paste or sponge active materials that are applied over or within bipolar plates. Some earlier inventions may use metal, plastic, fiberglass or composite cores with active materials applied over both sides of the core, but these active materials are not rigidly or tightly affixed to the core. Over time, these paste or sponge active materials may flake or fall off the biplates. In sharp contrast, the preferred embodiment of the present invention comprises an integral biplate 10 having a core 12 with two protective layers 16 & 18 that are firmly secured to the core 12 or to intermediate layers 14a & 14b that are also firmly secured to the core 12.

CONCLUSION

Although the present invention has been described in detail with reference to a particular preferred embodiment, persons possessing ordinary skill in the art to which this invention pertains will appreciate that various modifications and enhancements may be made without departing from the spirit and scope of the claims that follow. The various material choices and dimensions that have been disclosed above are intended to educate the reader about one preferred and three alternative embodiments, and are not intended to constrain the limits of the invention or the scope of the claims. The List of Reference Characters which follows is intended to provide the reader with a convenient means of identifying elements of the invention in the specification and drawings. This list is not intended to delineate or narrow the scope of the claims.

LIST OF REFERENCE CHARACTERS

Figure 10:
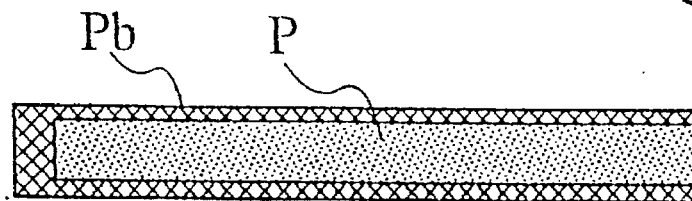

FIGS. 1, 2, 3 & 4
BP Biplate
CS Case
EL Electrolyte
ESA Edge seal area
GCS Grid cross-section
NAM Negative active material
PAM Positive active material
PAR Partition
SEP Separator
T Terminal
FIGS. 5, 6, 7, 8, 9 & 10
C/P Carbon-in-plastic
LS/P Lead spheres in plastic
P Plastic
Pb Lead
SnO$_2$/P Doped stannic oxide in plastic
FIG. 11
LMB Low maintenance battery
H Housing
M Fiberglass mats
NP Negative plates
PP Positive plates
T Terminals
V Resealable vent FIG. 12
B Bipolar plate battery
CC Current collector plate
CR Current removing element
E Enclosure
EP End plate
L Leads
S Central stack
TC Top cover
FIG. 13
10 Bipolar plate
12 Core
12a Upper surface of core
12b Lower surface of core
14a Upper intermediate layer
14b Lower intermediate layer
16 Negative protective layer
18 Positive protective layer
FIG. 14
20 First alternative embodiment
22 Core layer
22a Upper side of core layer
22b Lower side of core layer
24 Zirconium or molybdenum layer
26 Negative side protective layer
28 Copper or nickel layer
30 Positive side protective layer
FIG. 15
32 Second alternative embodiment
34 Core layer
34a Upper side of core layer
34b Lower side of core layer
36 Copper or nickel layer
38 Negative side protective layer
40 Positive side protective layer
FIG. 16
42 Third alternative embodiment
44 Core layer
44a a Upper side of core layer
44b Lower side of core layer
46 Zirconium layers
48 Copper or nickel layer
50 Negative protective layer
52 Titanium or tantalum layer
54 Positive protective layer
FIGS. 17, 18 & 19
56 Top view of biplates
58 Positive side seal
60 Partial cross-sectional view of battery
62 Stack of cells
64 Spacer frame
66 Electrolyte
68 Negative side seal
70 Sealant material
72 Insulating material

What is claimed is:

1. An apparatus for use in a bipolar lead-acid battery comprising:

a core layer having an upper and a lower side:

a negative side protective later, said negative side protective layer being located generally adjacent to said lower side of said core layer, and said negative side protective layer formed of a material which is capable of conducting electricity and which is capable of protecting said core layer from an acidic environment;

a positive side protective layer, said positive side protective layer being located generally adjacent to said upper side of said core layer, said positive protective layer formed of a material which is capable of conducting electricity, and said positive side protective layer being capable of protecting said core layer from a destructive electrochemical reaction in an oxidizing environment; and an intermediate layer formed between said core layer and said positive side protection layer.

2. An apparatus as claimed in claim 1, in which said intermediate layer is formed of a conductive material.

3. An apparatus as claimed in claim 1, in which said intermediate layer is formed of one of copper or nickel.

4. An apparatus for use in a bipolar lead-acid battery comprising:

a core layer having an upper and a lower side;

a negative side protective layer, said negative side protective layer being located generally adjacent to said lower side of said core layer, and said negative side protective layer formed of a material which is capable of conducting electricity and which is capable of protecting said core layer from an acidic environment;

a positive side protective layer, said positive side protective layer being located generally adjacent to said upper side of said core layer, said positive protective layer formed of a material which is capable of conducting electricity, and said positive side protective layer being capable of protecting said core layer from a destructive electrochemical reaction in an oxidizing environment; and an intermediate layer formed between said core layer and said negative side protection layer.

5. An apparatus as claimed in claim 4, in which said intermediate layer is conductive and facilitates the adhesion of said negative side protection layer to said core layer.

6. An apparatus as claimed in claim 4, in which said intermediate layer is formed of one of nickel or copper.

7. An apparatus for use in bipolar lead-acid battery comprising:

a core layer having an upper and a lower side;

a negative side protective layer;

said negative side protective layer being located generally adjacent to said lower side of said core layer; and said negative side protective layer formed of a material which is capable of conducting electricity; and said negative side protective layer formed of a material which is capable of protecting said core layer from an acidic environment;

a positive side protective layer;

said positive side protective layer being located generally adjacent to said upper side of said core layer;

said positive side protective layer formed of metal oxide materials which are capable of conducting electricity, said metal oxide materials including doped stannic oxide; and said positive side protective layer being capable of protecting said core layer from a destructive electrochemical reaction in an oxidizing environment.

8. An apparatus as claimed in claim 7, in which an intermediate layer is formed between said core layer and said positive side protection layer.

9. An apparatus as claimed in claim 8, in which said intermediate layer is formed of a conductive material.

10. An apparatus as claimed in claim 8, in which said intermediate layer is conductive and facilitates adhesion of layers.

* * * * *